United States Patent [19]

Prohofsky et al.

[11] Patent Number: 4,546,349
[45] Date of Patent: Oct. 8, 1985

[54] LOCAL ZOOM FOR RASTER SCAN DISPLAYS

[75] Inventors: LeRoy A. Prohofsky, Minneapolis; David G. Hanson, Spring Lake Park, both of Minn.

[73] Assignee: Sperry Corporation, New York, N.Y.

[21] Appl. No.: 623,617

[22] Filed: Jun. 22, 1984

Related U.S. Application Data

[63] Continuation of Ser. No. 306,831, Sep. 29, 1981, abandoned.

[51] Int. Cl.[4] ............................................. G09G 1/16
[52] U.S. Cl. .................................... 340/731; 340/724; 340/750
[58] Field of Search ............... 340/731, 723, 724, 750, 340/798, 799

[56] References Cited

U.S. PATENT DOCUMENTS

| | | | |
|---|---|---|---|
| 3,437,873 | 4/1969 | Eggert | 340/731 |
| 4,091,374 | 5/1978 | Müller | 340/731 |
| 4,107,662 | 8/1978 | Endo et al. | 340/731 |
| 4,197,590 | 4/1980 | Sukonick | 340/721 |
| 4,257,044 | 3/1981 | Fukuoka | 340/723 |

Primary Examiner—Marshall M. Curtis
Attorney, Agent, or Firm—William C. Fuess; Glenn W. Bowen

[57] ABSTRACT

Apparatus for selectively extracting, magnifying and juxtapositioning selected areas of a raster scan image relative to the primary image so as to permit an observer to better view selected areas of the primary image while still viewing the entire primary image. The apparatus essentially comprises means for sampling x and y radar address data and related video data, means for independently and selectively scaling and offsetting the address data for a primary image memory and for a local zoom memory and means for selecting the areas of the primary image that are to be magnified. The selected areas of the primary image are displayed at a rate defined by a zoom magnification factor, scaled and offset independent of the primary image—but relative to the local zoom area, and displayed by extracting the data from the local zoom memory, rather than the primary image memory, as the display raster scans the areas of the screen where the zoom image is to be displayed.

10 Claims, 6 Drawing Figures

LOCAL ZOOM FOR RASTER SCAN DISPLAYS

This is a continuation of application Ser. No. 306,831, filed Sept. 29, 1981, now abandoned.

BACKGROUND OF THE INVENTION

The present invention relates to raster scan displays wherein a zoom capability is desired. In particular the present invention relates to a display having a zoom capability that enables the magnification of localized portions of a primary image and the juxtapositioning of the so called zoomed image with respect to the real time image on a common screen.

Prior to the present invention, the typical zoom capability for a radar display required that the entire display image be magnified and displayed. This zoom operation, while permitting viewing the desired image data in greater detail, at the same time, lost substantial portions of the image due to the expansion of the image beyond the boundaries of the fixed display. This occurred because many of the targets that were contained within the fringes of the primary image, upon magnification, fell outside the bounds of the primary image memory and consequently were lost to the image.

The operation of these displays also generally required that the operator first position the display's cursor at a desired location—typically the center of the area to be magnified—and then select the zoom function. The display then adjusted its scale and offset values so as to reposition the selected area in the center of the selected area at the selected magnification factor, but with the attendant problems mentioned above.

The present invention not only permits an operator to similarly select a localized area that he/she desires to zoom, but also to juxtapose the magnified area relative to the unmagnified area, in an uncluttered area of the display, thereby permitting the operator to more closely inspect the zoomed area without losing sight of the rest of the traffic being displayed on the screen. Thus, the operator is able to better distinguish the relative separation between objects that are being tracked when they are relatively close together such as during high traffic situations. Additional operator selected functions that are enabled by the present invention are the operator's ability to position the local zoom data via the use of the joystick, select the frame size within which the zoom data is to appear, control the synthetic persistence of the displayed images, select the magnification or zoom factor desired and provide a multiport local zoom memory design.

The advantages of the present invention will however become more apparent upon a reading of the following description. Further, the operation of the apparatus of the preferred embodiment should become more apparent as well as various equivalent circuitry that can perform the same functions.

SUMMARY OF THE INVENTION

Apparatus adaptable to a raster scan display for enabling a local zoom capability, whereby a display operator can selectively magnify a localized area of the primary display image and juxtapose the magnified image relative to the primary image. The apparatus is selectively operable in parallel with the primary image and essentially comprises means for independently scaling and offsetting the x-y axial coordinates of selected primary image data (i.e. local zoom data), means for selectively establishing an area of the display wherein the local zoom image is to be displayed, means for temporarily storing the local zoom data and means for reading the local zoom data at the proper rate as the display is raster scanned so that the proper juxtapositioning of the primary and local zoom images occurs.

The apparatus also includes means for permitting local zoom scrolling or tracking of a moving image within the local zoom frame, means for refreshing the local zoom image and means for controlling the synthetic persistence of the local zoom image. The apparatus thus enables an operator to selectively inspect localized areas of a raster scan display's primary image, while still maintaining surveillance of the entire primary image.

DESCRIPTION OF THE PREFERRED EMBODIMENT

Figure 1:
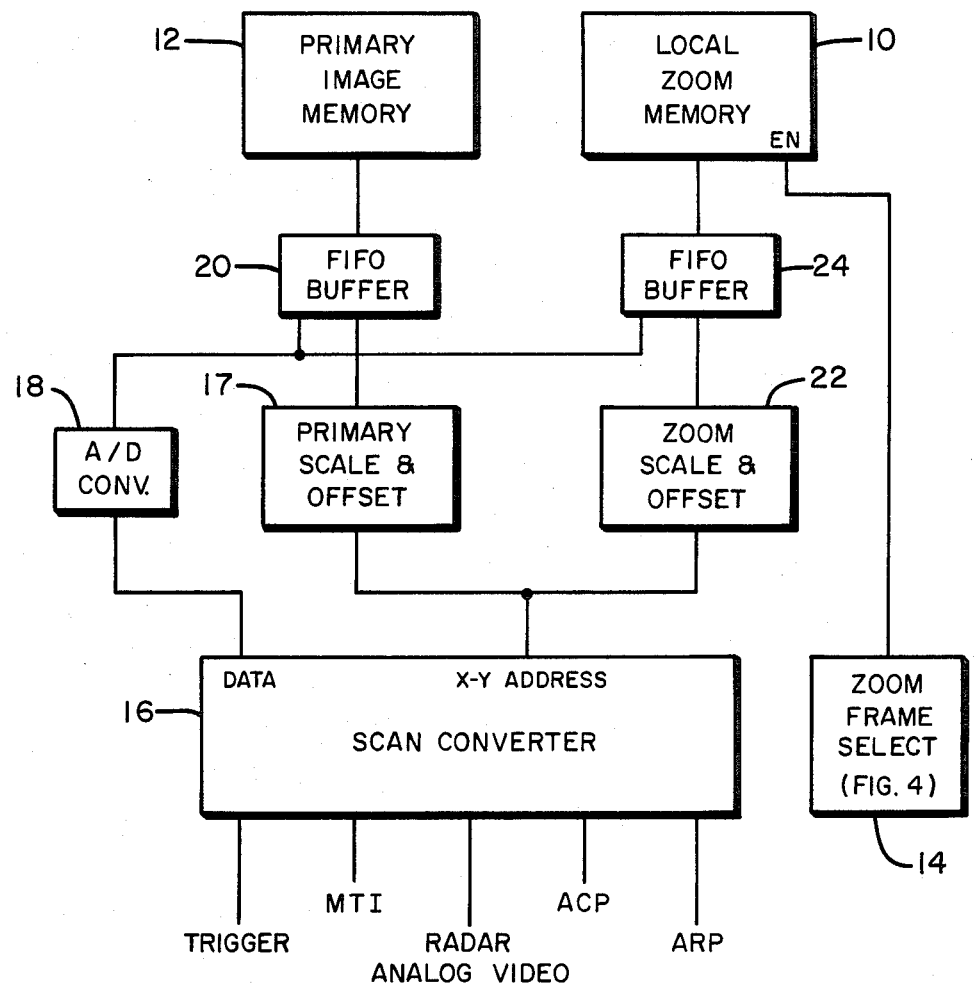
FIG. 1 is a generalized block diagram of the present invention as it relates to the primary image memory of a radar display.

Referring to FIG. 1, a generalized block diagram is shown of the present local zoom capability as it relates to the primary image circuitry of a raster scan radar display. Essentially the local zoom capability is implemented via the parallel operation of a local zoom memory 10 while storing primary image data in the primary image memory 12. Thus, upon selecting the local zoom capability, the present apparatus independently examines the selected area of the primary image and independently scales and offsets the digitized video data prior to storing the data in the local zoom memory 10. The raster scan display, upon scanning the display's screen, then selectively accesses the data from either the primary image memory 12 or the local zoom memory 10 as it scans each raster scan line. The local zoom memory 10 however is only actuated when the raster scan circuitry scans the x-y axial addresses contained within the frame parameters established by the frame select circuitry 14. A schematic diagram of the frame select circuitry can be seen with reference to FIG. 4 and a more detailed description thereof will be provided hereinafter. The present apparatus thus permits the juxtapositioning of a magnified, local area of the primary image relative to the primary image. Additional capabilities provided by the present invention and which will be described in greater detail hereinafter are the capability of scrolling or tracking a moving image within the zoomed frame and the capability of independently controlling the intensity decrementation of the zoomed image.

The primary image and zoom image circuitry of the raster scan display are, however, each dependent upon the scan converter circuitry 16. The circuitry of the scan converter 16 is generally well known though and it acts to convert the analog video addresses from polar coordinates to Cartesian coordinates in a table lookup fashion. The scan converter 16 performs this function by monitoring the radar's analog video relative to an azimuth change pulse (ACP), an azimuth reference pulse (ARP), and a trigger pulse. The ARP defines true north with respect to the radar sweep and acts as a reference to the ACP and trigger; and as the radar sweeps 360°, 4096 ACP pulses are counted. The pretrigger pulse is an internal pulse that anticipates the radar pulse by a fixed delay period, and the trigger corresponds to the actual transmission of the radar pulse. Upon the occurrence of the trigger pulse, the scan converter 16 detects the count in the ACP counter (not shown) and knowing the ARP translates the coordinates of the polar input data received in response to the radar pulse to Cartesian coordinates that are compatible with the primary image and local zoom memories 12 and 10. As mentioned, the scan converter 16 performs this function generally in a table lookup fashion from a memory that has had its contents established in accordance with a well known algorithm and is thus able to assign x-y coordinates to the analog radar video data, relative to the center of the radar tracking equipment.

Upon establishing the x-y Cartesian coordinates for each element of analog radar video, it is next necessary to scale and offset the coordinates so as to properly position the data relative to the center of the display's screen. In the preferred embodiment, a high resolution cathode ray tube (CRT) color monitor is used that employs a 19 inch, delta gun, shadow mask tube having a 1024 by 1024 dot matrix, a 60 Hertz vertical interlaced scan, a 33 Kilohertz horizontal scan and a 16 level 80 Megahertz video signal. Dependng upon the resolution of the CRT and corresponding primary image memory 12, the scale and offset factors may have to be varied but in general these factor are fixed constants that are added to each of the scan converter addresses so as to reposition the radar data relative to the screen of the CRT.

The scan converter addresses for the primary image are scaled and offset via the corresponding scale and offset circuitry 16, which also digitizes the analog radar video via the analog-to-digital converter 18 and stores the digitized data in the first-in, first-out (FIFO) buffer 20 at the translated addresses. The buffer 20 has a FIFO memory which acts to temporarily store the radar data prior to writing it into the primary image memory 12. Upon display, the data is then read from the primary image memory 12 and displayed at the corresponding pixels on the display's 1024 by 1024 dot matrix. It is to be noted that the primary image memory 12 is comprised of 3 planes of memory, where each plane is similarly segmented into a 1024 by 1024 matrix. The primary image memory 12 thus provides eight levels of intensity. The raster scanning of the CRT's screen is also synchronized to the reading of the primary image memory 12 so as to properly blank and unblank the CRT's electron gun when data is found at the various memory addresses.

At the same time that the primary image data is being scaled and offset, the scan converter addresses for the local zoom data are impressed on the zoom scale and offset circuitry 22 where the addresses are scaled and offset, depending upon operator selection, relative to the primary image. The zoom analog video data is also digitized by the A/D converter 18 and the digitized zoom data along with the scaled and offset zoom addresses are then temporarily stored in the FIFO buffer 24. From the FIFO buffer 24, the zoom data is then written into the local zoom memory 10 at the appropriate addresses. The local zoom memory 10 of the preferred embodiment is generally comprised of five memory banks and each bank contains a 256 by 256 by 1 bit array that is organized so as to contain 4096 words. Each word, in turn, is comprised of 16 bits. The local zoom memory 10 thus enables the operator at maximum magnification to zoom a localized area and display it on approximately one-sixteenth of the CRT's screen with each pixel having thirty-two separate levels of intensity.

Figure 2:
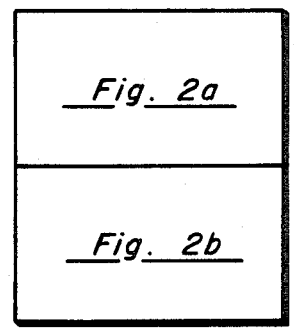
FIG. 2, comprised of FIGS. 2a and 2b, is a schematic diagram of the local zoom circuitry of the preferred embodiment.
Figure 2A:
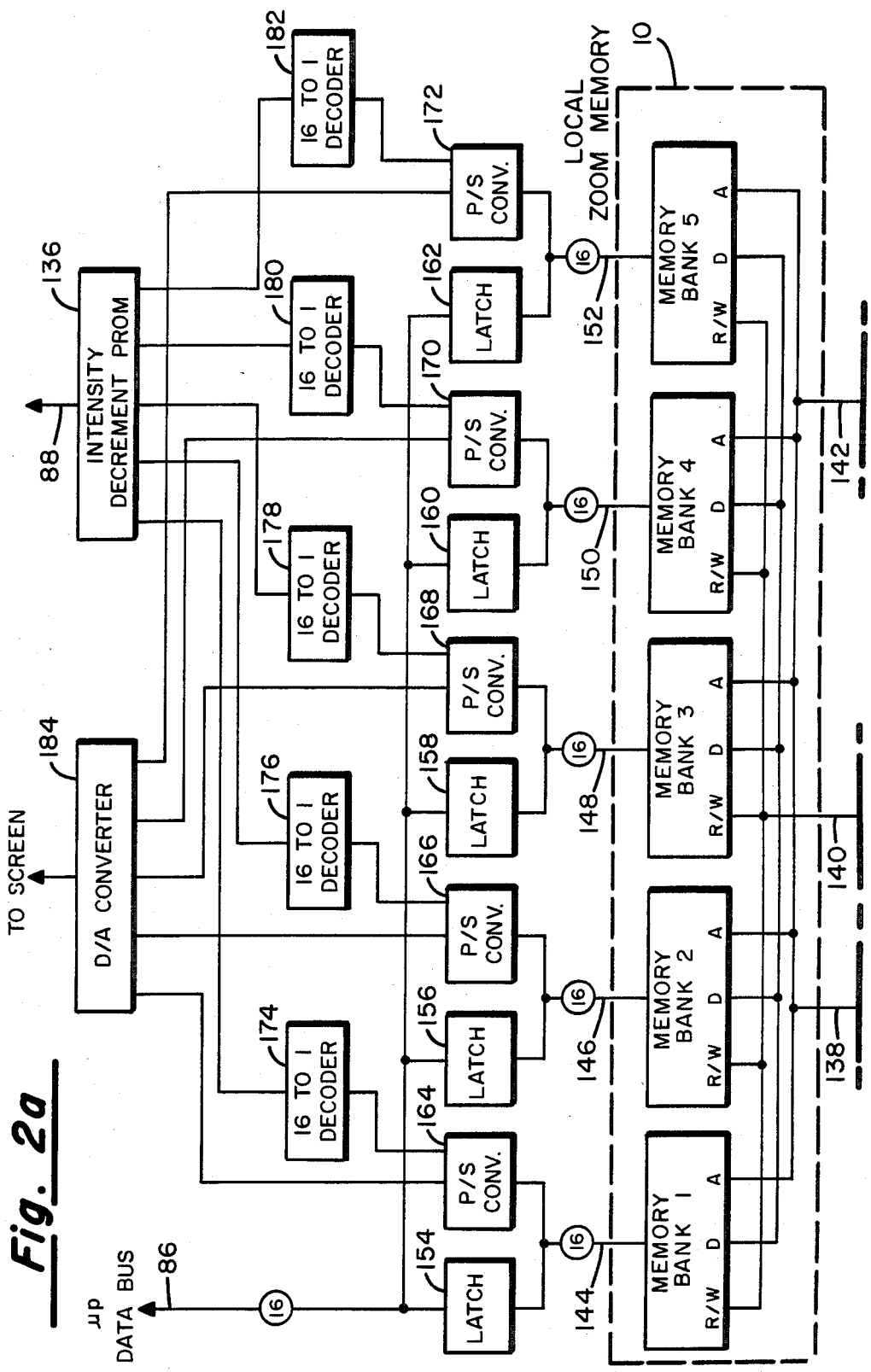
Figure 2B:
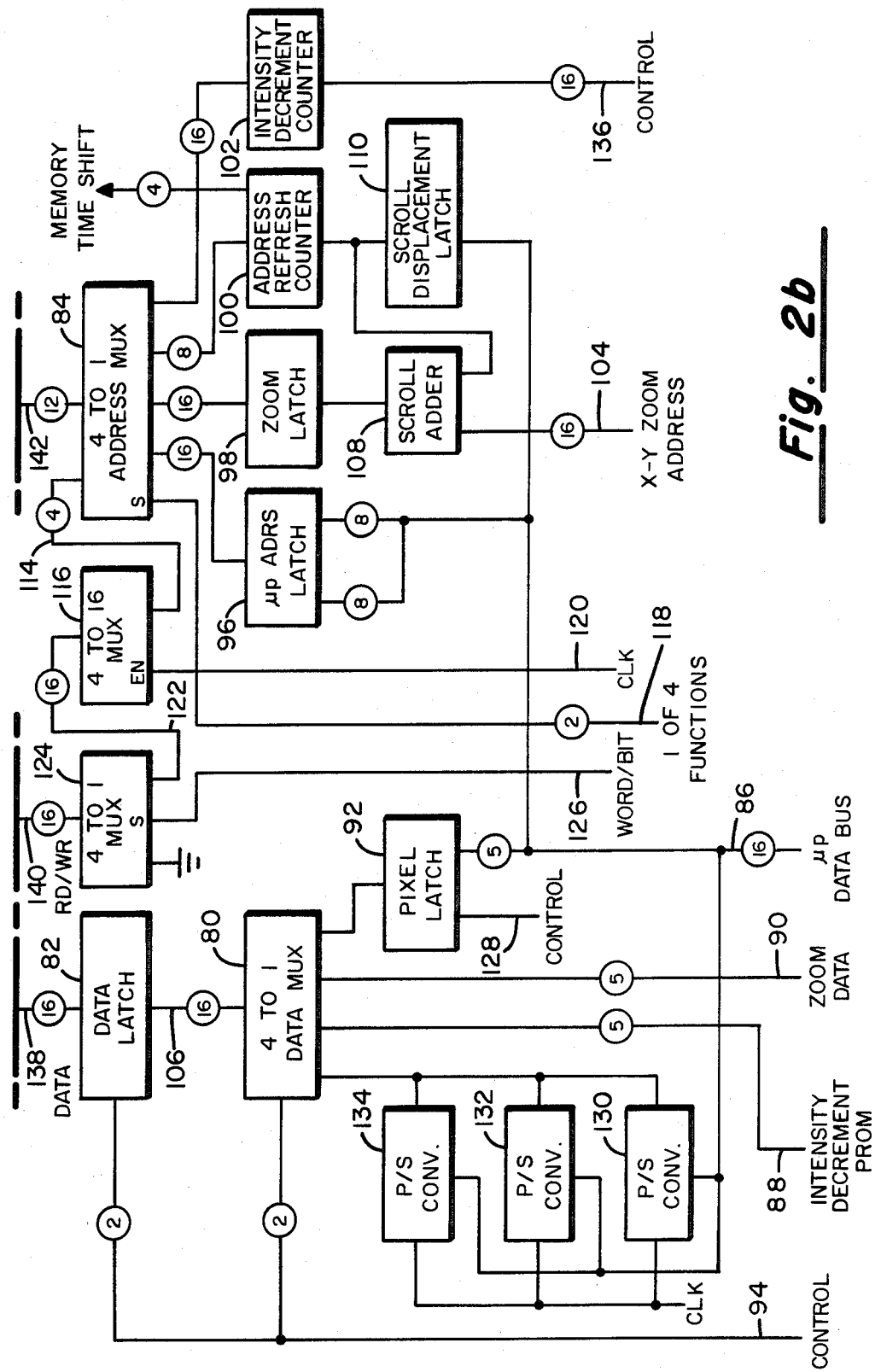
Figure 3:
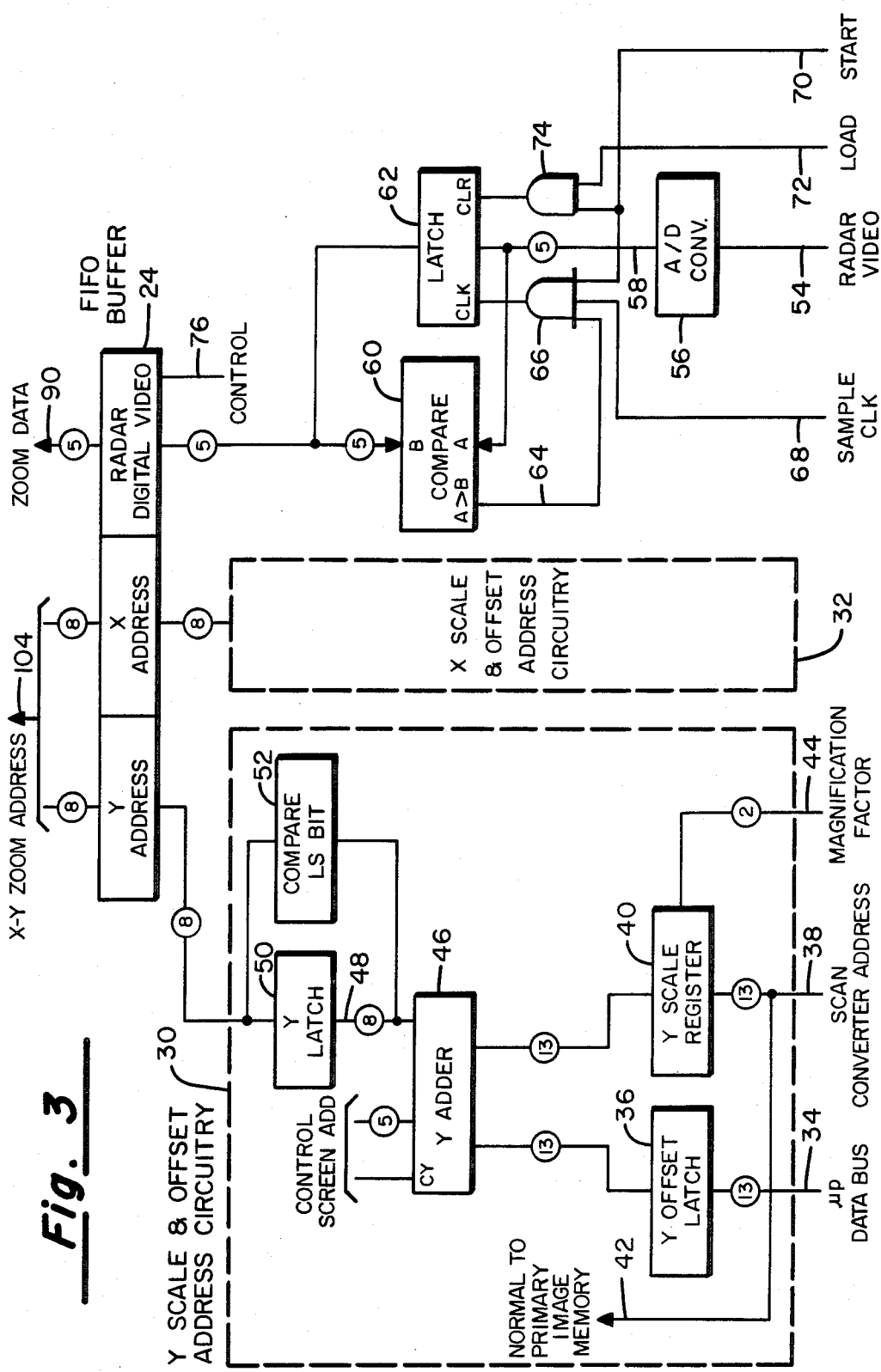
FIG. 3 is a schematic diagram of the circuitry that is used to scale and offset the radar video data that the operator desires to zoom.

Referring next to FIG. 2, comprised of FIGS. 2a and 2b, a detailed schematic diagram of the circuitry of the present invention is shown. Prior too describing this circuitry, however, attention is directed to FIGS. 3 and 4 wherein detailed schematic diagrams are shown of the zoom scale and offset circuitry 22 and the zoom frame select circuitry 14. Referring first to FIG. 3 it should be realized that the zoom function is initiated via a two step operation that requires the operator to first move the display cursor to a desired localized area on the screen and select the zoom magnification ratio. Then secondly to move the cursor to the center of the selected area and engage the zoom initiate switch. These two actions thus enable a microprocessor that is coupled to the cursor to detect the desired magnification factor and calculate the required x and y offset—by performing a subtraction between the two positions to determine the offset magnitude in x and y—that must be added to the x and y zoom addresses so as to properly position the zoom image on the CRT screen.

The operator initiated inputs (i.e. magnification factor and start) can be seen upon referring to the circuitry of FIG. 3. It should be noted, too, that only the y scan converter address circuitry 30 is shown, since the x scan converter address circuitry 32 is identical. The only difference being that x scan converter address circuitry receives the x values of the Cartesian coordinates from the scan converter 16 and the x offset value from the microprocessor.

Referring next to the y scale and offset address circuitry 30, it is to be noted that the 13 bit microprocessor calculated y offset value is applied on bus 34 to the y offset latch 36 where it is temporarily stored. The y values of the converted polar coordinates that are produced by the scan converter 16 are then received via the 13 bit bus 38, scaled and stored in the y scale register 40. The y scale register 40 essentially comprises a 16 bit shift register and enables the scaling of the addresses by the various magnification factors of 1×, 2×, 4× and 8× by merely shifting each y address value by a corresponding one, two or three bit positions. While the ×1 magnification factor implies an unmagnified or normal condition, typically a magnification factor of 2×, 4× or 8× will be selected by the operator by positioning the proper switches on the operator's control panel. The magnification factor is then received from the two bit bus 44 by the y scale register 40 and decoded to cause the register 40 to shift the data the corresponding number of bit positions. Thus, the magnification factor via the x and y scale registers produces the required scaling of the x and y zoom addresses.

The scaled and offset y values from registers 40 and 36 are next added by the y adder 46. The carry, if any, and the five most significant bits of the sum from the y offset adder 46 are then used to determine if the generated address falls within the bounds of the local zoom memory. The least least significant eight bits of the sum, and which are representative of the y address value for the local zoom memory, are then transmitted via the eight bit bus 48 to the y latch 50. The least significant bit of the eight bit y address value is also stored in the compare least significant bit register 52. This operation will, however be described in greater detail hereinafter. And, finally the eight bit y address value is transferred from the y latch 50 to the y address section of the FIFO buffer 24.

Similarly, the x address value for each of the 256 addresses of the local zoom memory 10 is calculated by the x scan converter address circuitry 32, and the resultant x address values are stored in the corresponding x sections of the FIFO buffer 24 as they are calculated. The x and y address values of the corresponding digitized video radar are thus stored in the FIFO buffer 24 prior to being impressed on the circuitry of FIG. 2.

While the x and y zoom addresses are scaled and offset, the associated analog radar video signals are received and digitized. The analog radar signals are received via line 54 and are impressed upon the analog-to-digital converter 56. There the analog radar signal for each x, y addresses is converted to a five bit digital signal. Upon digitizing each rada video signal, the digitized signals are then transmitted via line 58 to the comparator 60 and the latch 62. The comparator 60 and latch 62 then preview each sample of the digitized data during each sampling period, the duration of which period will be determined by the selected magnification factor. While the circuitry samples the analog video radar at a 5 MHz rate, and which rate is selected to permit the 8× magnification, this rate is not required for all magnification factors. Therefore the comparator 60 and latch 62 operate in a peak comparator fashion and save only the maximum sample within any given sampling period. It is the maximum radar video signal sample for a period that is then stored in the FIFO buffer along with its associated converted x, y address.

Each digitized sample is thus compared by comparator 60 to the previous maximum value stored in latch 62. As each sample is received on line 58, it is impressed on the A port of the comparator 60 while the value stored in the latch 62 is impressed on the B port. If the A value is less than the B value, the comparator and latch do nothing and await the next sample. If however the A value is greater than the B value, a logic signal is produced on line 64 that causes NAND gate 66 to be made—NAND gate 66 is made due to the coincident sample clock signal on line 68 and the zoom start signal on line 70. The making of NAND gate 66, in turn, causes the latch 62 to be clocked and the A value sample to be stored in latch 62. This value then becomes the B value for the next comparison. Similarly, for each sample within a sampling period, it is compared to the previous maximum value. Upon the end of the sampling period, a load signal is impressed via the system clock (not shown) on conductor 72 so as to cause NAND gate 74 to be made and clear the latch 62. At the same time a control signal on line 76 clocks the maximum value to the FIFO buffer 24 along with its associated x and y address values. It is to be noted that a sample is compared once each 200 nanoseconds for the 8× magnification. Therefore the sampling periods for the 1×, 2× and 4× magnification factors are 1.6 milliseconds, 0.8 milliseconds and 400 nanoseconds.

Because the provision for numerous magnification factors requires numerous sampling periods, it is also necessary to ensure that the x, y address values correspond to the maximum digitized video radar value. This function is performed for the y address values by the y latch 50 and the comparator 52. Thus, as each converted address value is received from the y adder 46, and because the sampling periods are not so great as to cause more than the least significant bit value to change, the least significant bit of each y address is latched and compared, as with the digitized video signals, during each sampling period. Therefore the y address value in the y latch 50 always corresponds to the location at which the maximum digitized video radar is detected. Similarly, the x scale and offset address circuitry 32 latches the maximum x address value so that upon the occurrence of the control signal on line 76 ending the sampling period, the maximum digitized video radar and the corresponding x and y address values are stored in the FIFO buffer 24. From FIFO buffer 24 the digitized data and addresses are next multiplexed into the local zoom memory 10 and which operation can best be understood with reference to FIG. 2, comprised of FIGS. 2a and 2b.

Prior to referring to FIG. 2, it should be noted that this circuitry display generally acts to write the data from the FIFO buffer 24 into consecutive addresses of the local zoom memory so that upon display the data will be read and displayed at the scaled and offset address locations. It should also be noted that the writing function consumes a relatively small amount of time and therefore the circuitry of FIG. 2 also permits the refreshing of the display, a scrolling or target function, a synthetic persistence function and independent microprocessor accessing. These functions, in turn, are controlled via the multiplexing of the requisite inputs via the four-to-one data multiplexor 80 and associated latch 82 and the four-to-one address multiplexor 84.

Referring to FIG. 2b and in particular the operations of the circuitry surrounding the four-to-one data multiplexor 80, it can be seen that the multiplexor 80 primarily receives its inputs from the sixteen bit microprocessor data bus 86, the intensity decrement prom bus 88, the zoom data bus 90 and the five bit pixel latch 92. The input selection then being dependent upon the two bit binary control signal on line 94 and a two bit control signal which loads and clears latch 82. Similarly, the four-to-one address multiplexor 84 receives four inputs from the microprocessor address latch 96, the zoom latch 98, the address refresh counter 100 and the intensity decrement counter 102. Thus the data multiplexor 80 handles data functions and the address multiplexor 84 handles address functions.

As mentioned the primary function of the circuitry of FIG. 2 is to read and write data into the local zoom memory 10, and thus during a read or write operation, the appropriate zoom data from the data but 90 and address data from the x, y zoom address data bus 104 are selected via the multiplexors 80 and 84. During a write operation the data multiplexor 80 selects the five bits of zoom data from the data bus 90 and transmits it via the five bit bus 106 to the data latch 82, and from which the data is subsequently transmitted to the local zoom memory 10. At the same time the corresponding x, y zoom addresses are received via the sixteen bit address bus 104 and scroll adder 108. The x, y address values are then transmitted to the zoom latch 98 and are next selected via the address multiplexor 84 so that the zoom data and corresponding addresses are received coincidentally by the local zoom memory 10. The read operation differing in that only an address is transmitted to zoom memory 10 along with a read enable.

It should next be noted that a scroll function is provided, so that if the scroll displacement function is selected, the x, y address values will be added to the scroll displacement values in the scroll displacement latch 110 and cause the zoom image to adjust to target movement. The scrolling function thus ensures that the target, if it is moving, stays centered within the local zoom frame. The present scroll function also anticipates that the target will move horizontally and/or vertically and therefore appropriately scrolls the addresses within the local zoom memory so that the data is continuously being displaced to an address that anticipates the movement of the target. The proper scrolling is anticipated via the microprocessor and which determines each displacement value and inserts this value via the data bus 86 into the scroll displacement latch 110. Each value is typically a modulus of octal 256 so that the scrolling can proceed forwards and backwards if the target is moving down or up. The displacement value is then redetermined each time the target moves or within a given time period and the new value is then inserted into the displacement latch 110 and the scroll adder 108 so that the x, y zoom addresses are properly adjusted to the movement of the target.

Similarly, during the refresh operation, which occurs once every 32 milliseconds, and assuming the display is scrolling the target in the read mode, it is necessary to call up the correct displacement address value from the microprocessor and load it into the scroll displacement latch 110. This value is then loaded into the address refresh counter 100 as its start value. The counter 100 then counts up from this value and produces the refresh row addresses until each row of the local zoom image is refreshed. If the target is not moving and/or the scroll function has not been selected, a displacement address value need not be called up. Rather, the counter begins at a zero value and counts up until all 256 rows of the local zoom image have been refreshed.

It should be noted too that the address refresh counter 100 is made up of a seven bit wide row counter with the least significant bit of the eight bit row address determined by the odd or even interleave field being displayed, a four bit x word address counter and a four bit x memory time shift register. Consequently, twelve bits of the address refresh counter 100 are selected by the address multiplexor 84 during a local zoom image memory refresh cycle. The four bit value in the memory time shift register is used to change the timing of the local zoom image memory read with respect to the primary image memory read to get the proper horizontal pixel registration of the local zoom position with respect to the primary image matrix.

It is to be noted too that it is only during the refresh operation that less than sixteen bits are received via the address multiplexor 84. Otherwise, in all other cases sixteen bits are received. The eight least significant of the sixteen bits define the row address and the other eight bits define a single bit location or x address (i.e. pixel address). The x address is located via a two pronged approach and requires transmitting four of the eight more significant bits to the local zoom memory 10 for selecting one of the sixteen, sixteen bit words contained in each 256 bit row. Twelve bits are therefore transmitted to the address ports (A) of the local zoom memory 10. The other four of the eight more significant bits then generally define where within the selected one of sixteen words that the bit is located, and these four bits are transmitted via the four bit bus 114 to the multiplexor 116. It should also be noted before passing, that the two bits on bus 118 define which of the four inputs to the address multiplexor 84 are to be selected. The multiplexor 116, in response to the clock signal on conductor 120, then produces a one of sixteen bit signal that is transmitted via the sixteen bit bus 122 to the multiplexor 124, where the word or bit mode is selected. The mode selection is achieved via the select value on conductor 126, and thus the data is written a bit or word at a time. The data is read from memory a word at a time. However, during a write operation the data will be contained in data latch 82.

While the proper word or bit address is being selected, the data is also being selected via the data multiplexor 80 and latched in the data latch 82. As mentioned, the data multiplexor 80 can receive any of four types of data on its inputs. It, however, will select only one of these inputs for subsequent transmission to the data latch 82. The specific input selected is dependent on two of the select bits on the four bit bus 94. The other two select bits then establish the proper operation of the data latch 82. Assuming that the display system desires to write data from the microprocessor into the local zoom memory 10, the data is received via the microprocessor data bus 86. The data is received either as a five bit pixel (i.e. one bit for each plane of the zoom memory 10) or as three consecutive sixteen bit words. If a five bit pixel is received from the microprocessor data bus 86 during the allotted time, the five bits will be latched wihin the pixel latch 92 via the clocking of the control line 128. These five bits upon being selected by the data multiplexor 80 then define the data to be written at the bit address location in each of the five planes of the local zoom memory 10. If, however, the parallel-to-serial converter data is selected, each of three successive sixteen bit words will be received and clocked into and out of the parallel to serial converters 130, 132 and 134. The data will then be sequentially transmitted via the data multiplexor 80 and the data latch 82 to the proper locations within the zoom memory as selected by the address circuitry.

It is to be noted, however, that only three planes of the local zoom memory 10 receive data from the parallel-to-serial converters with the two least significant data bits forced to zero in this made. This mode is used in the transfer of data from the 3 plane primary image memory 12 to the 5 plane local zoom memory 10.

Similarly, during the intensity decrement function, five bits of data will be received via the five bit bus 88. If intensity decrement data is received, it will be loaded into the memory locations defined via the addresses that appear on the output of the intensity decrement counter 102. The initial address is fixed via the sixteen bit input from the sixteen bit control bus 136. It is to be noted too that the intensity decrement counter 102, once it has been loaded with its initial count, counts sequentially so that all the data stored in the local zoom memory 10 is properly decremented in intensity. This decrementation occurs via a pseudo-random decrementation of the five bits of data that are descriptive of each pixel in the local zoom frame and which five bits are stored in the respective five planes of the local zoom memory 10. Thus as the addresses are counted via counter 102, the proper decrementation data is extracted from the intensity decrement prom 136 and written into the local zoom memory 10. A detailed description of this pseudo-random selection and the apparatus for performing this function can be found upon reference to the co-pending application of D. G. Hanson, et al.

The data multiplexor 80 is also able to receive a five bit input from the zoom data bus 90. This data, as previously described, represents the zoomed image of the localized area of the primary image; upon selecting the data and corresponding address via the data multiplexor 80 and address multiplexor 84, the data and appropriate address information are transmitted via the sixteen bit buses 138 and 140 and the twelve bit bus 142 of the local zoom memory 10 in the manner previously described.

Referring next to FIG. 2a, the five planes or banks of the local zoom memory 10 can be seen more clearly. As mentioned each bank or plane of the local zoom memory 10 is configured in a 256 by 256 by one bit array that corresponds to the pixels in the local zoom area of the display screen. Each of the 256 by 256 pixels that comprise the local zoom area of the display are thus described via one bit in each of the five banks of the local zoom memory 10, so that each pixel is described by five bits of data that in turn is descriptive of the intensity at which each pixel is to be displayed.

When data is read from the local zoom memory 10, it is accessed via the address multiplexor 84 and the read/write multiplexor 124 which respectively establish the address and the read mode for the local zoom memory 10. Because data is read from the local zoom memory 10 a word at a time sixteen bit buses 144, 146, 148, 150 and 152 are provided from the respective memory banks 1, 2, 3, 4, and 5. The data during the read operation is then transmitted to the latches 154, 156, 158, 160 and 162 as well as to the parallel to serial converters 164, 166, 168, 170 and 172. Depending upon the application and assuming the data is being read up by the microprocessor, it can be retransmitted from the latches to the microprocessor via the microprocessor data bus 86. The data from each memory bank is then transmitted sequentially by word to the microprocessor where it is processed for subsequent use, such as during a scrolling operation.

If, however, an intensity decrement operation is to occur the data will be read from each of the memory banks and transmitted to the sixteen-to-one decoders 174, 176, 178, 180, and 182. There the desired bit that is representative of the pixel location that is to be decremented will be selected, and be transmitted to the intensity decrement prom 136. There the selected data will be temporarily stored for subsequent decrementation and re-writing into the local zoom memory 10, but which operation is the subject of another invention and which is described in the referenced co-pending application.

During a local zoom display refresh operation, data is read from each of the memory banks. This data is then transmitted via the parallel to serial converters, 164, 166, 168, 170 and 172 directly to the digital-to-analog converter 184. There the selected five bits or pixel data is converted to an analog form for driving the intensity control of the CRT. During the raster scanning of each line of the primary image, when the local zoom frame is being scanned, each pixel of data is then read and inserted into the display image. It is to be recognized though that typically not all the pixels are displayed so that only some of the pixels will be unblanked and contain data, whereas the majority of pixels will contain no data and be blanked.

Figure 4:
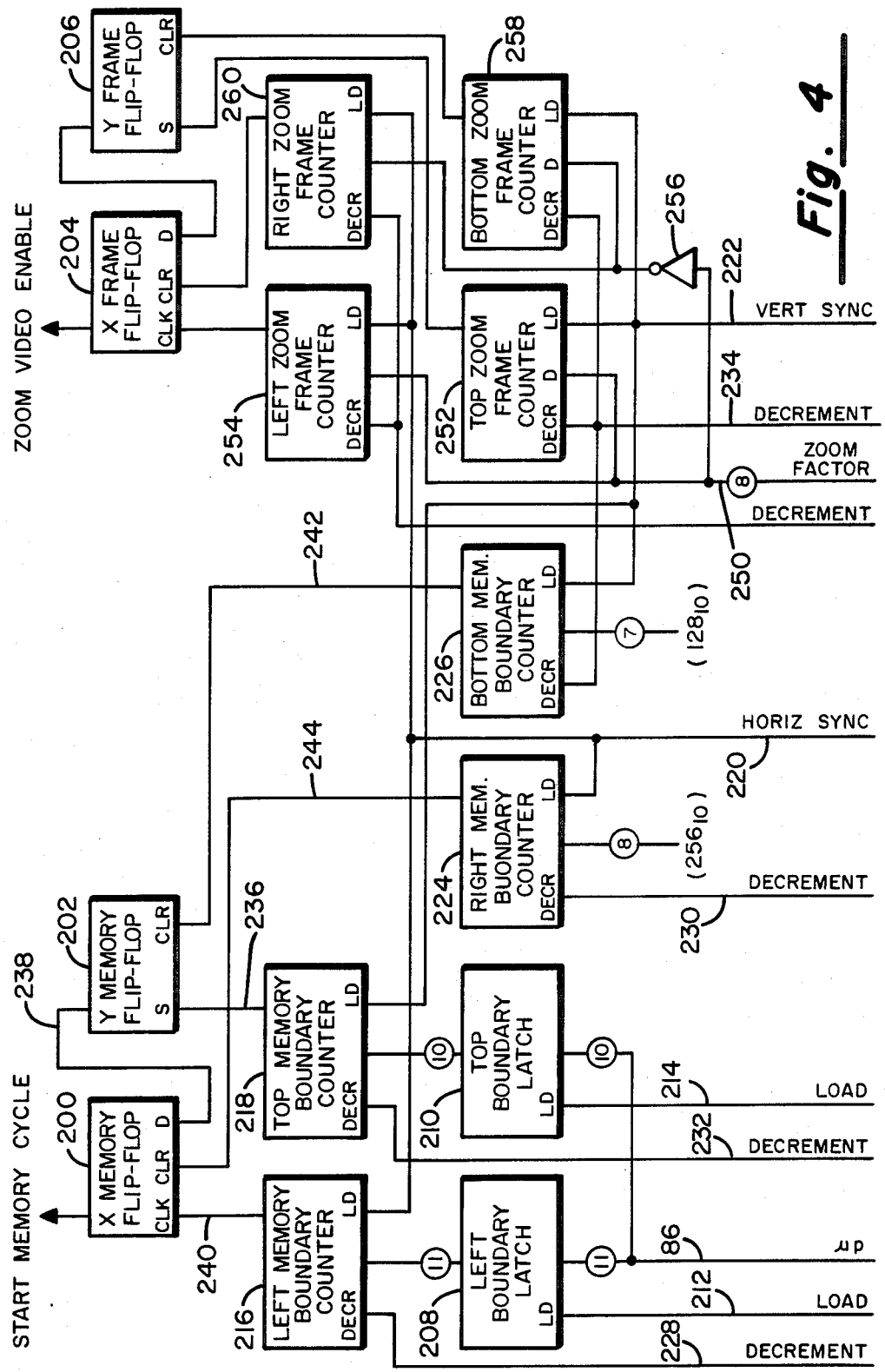
FIG. 4 is a schematic diagram of the circuitry that establishes the frame boundaries for the zoom image.

Referring next to FIG. 4, it is to be noted that this circuitry establishes the proper zoom frame size relative to the area selected by the operator when the zoom function is selected. Recalling that it is necessary for the operator to position the cursor at a point where the local zoom image is desired, the coordinates of this point are interpreted via the microprocessor upon the operator's selection of the zoom function so as to establish the location for the display of the zoomed image. Upon displaying the local zoom image, the local zoom memory is then read between the boundaries of the frame as the display raster scans each line. Thus, the local zoom memory 10 is read sequentially during the display and refresh, but intermittently, as dictated by the address boundaries of the local zoom image relative to the primary image, and in lieu of the primary image memory. The proper synchronization of the reading of the local zoom memory 10 relative to the addresses of the primary image memory 12 is then achieved via the x and y memory flip-flops 202 which produce a start memory cycle signal as each raster scan line within the local zoom frame is raster scanned and a concurrent zoom video enable signal via the x and y frame flip-flops 204 and 206. Because the display's screen is raster scanned from top to bottom, the x and y memory flip-flops 200 and 202 establish the boundaries of the local zoom memory frame, while the x and y frame flip-flops 204 and 206, establish the boundaries of the local zoom frame.

Upon the operator's positioning of the center of the local zoom frame, the microprocessor reads the coordinates of this point relative to the top and left boundaries of the primary image. At the same time the microprocessor knows that the memory size is 256 by 256 pixels so that it can perform the appropriate subtractions to determine the left and top boundaries of the local zoom memory. These values are then received serially from the microprocessor via the microprocessor data bus 86 and are loaded into the left and top boundary latches 208 and 210, upon the occurrence of the load signals on conductors 212 and 214. These left and top boundary values are next loaded into the left and top memory boundary counters, upon the occurrence of the respective horizontal and vertical sync pulses that are received on conductors 220 and 222. At the same time that the left and top boundary values are loaded, so too are the decimal values of $256_{10}$ and $128_{10}$ loaded into the respective right memory and bottom memory boundary counters 224 and 226. Prior to continuing, it should be noted that the horizontal sync rate corresponds to the rate at which each raster row of the display is scanned and the vertical sync rate is the rate at which 512 of the raster scan lines are scanned. It should be recognized too that the present display operates in an interlaced fashion with every other raster scan line being scanned on each pass so that it takes two interlaced passes or two vertical sync pulses to scan all the raster lines. This is also why the bottom memory counter 226 is loaded with a decimal $128_{10}$ as opposed to the otherwise expected $256_{10}$.

Upon loading each of the various counters 216, 218, 224 and 226, each counts down at either the dot rate or the line rate, where the dot rate corresponds to approximately 25 nanoseconds and the line rate corresponds to approximately 32 microseconds. Specifically, the left and right memory boundary counters 216 and 224 count at the pixel display rate via conductors 228 and 230 while the top and bottom memory counters 218 and 226 count at the horizontal sync rate via conductors 232 and 234. Thus, the left and top memory boundary counters 216 and 218 count down from their preestablished values to locate the top left corner of the local zoom image memory. Similarly the right and bottom memory boundary counters 224 and 226 count down as the image memory data is displayed in its interlaced fashion.

Looking to the top memory boundary counter 218, upon its counting down to zero, and which corresponds to the top boundary of the local zoom image memory a logic signal is produced on conductor 236 so as to cause the y memory flip-flop 202 to set. The setting of the y memory flip-flop 202 causes a data signal to be impressed on the data input of the x memory flip-flop 200 via conductor 238. At the same time and for each raster scan line thereafter until the bottom boundary is reached, the left memory boundary counter 216 counts down from its preset value to locate the left boundary of the local zoom image memory. Upon counting down to zero for each raster scan line a clock signal is produced on conductor 240 for each raster scan line, but it is only when the top memory boundary counter 218 has counted to zero that data is present on its data input. At this time the x memory flip-flop 200 is set and the memory cycle starts.

The memory cycle continues for the next 128 raster scan lines until the bottom memory counter counts to zero and causes the y memory flip-flop 202 to clear via the signal on conductor 242. It should be noted too that for each raster scan line as it scans from left to right, the right memory boundary counter counts down from 256 to zero so as to establish the right boundary of the local zoom image memory. Upon reaching zero, the right memory boundary counter 224 produces a clear signal on the conductor 244 which causes the x memory flip-flop 200 to clear. The x memory flip-flop 200, however, is reclocked for the next raster scan line and if the y memory flip-flop 202 is set, the start memory cycle is enabled. Thus, the start memory cycle is enabled for the first 128 raster scan lines of the local zoom memory and again during the second interlaced scan of the primary image so that the second 128 raster scan lines of the local zoom memory are scanned as the boundaries of the local zoom image memory are again counted. It is to be noted that the start memory cycle enable signal causes the reading of the local zoom memory 10, assuming the local zoom function has been selected, as the primary image memory is scanned.

Recalling too that the present apparatus permits the operator to select a magnification factor of 1×, 2×, 4×, or 8×, it should be noted that the local image for zoom will correspondingly be expanded an amount depending upon the magnification factor.

The reduction in local zoom frame size is achieved via the eight bit initial values that are loaded into the top and left zoom frame counters 252 and 254 and the inverse values due to inverter 256, that are loaded into the bottom and right zoom frame counters 258 and 260. These initial values thus establish the number of rows in a local zoom frame and the width thereof.

While the start memory cycle and zoom enable signals enable the reading of the local zoom memory 10, the left, right, top and bottom zoom frame counters 254, 260, 252, and 258 cause the actual placement of the local zoom image relative to the primary image in a fashion similar to that described for initiating the start memory cycles. Thus upon loading the initial values into these counters the counting down therefrom during the raster scanning of each of the lines, the top left corner of the local zoom frame is first located with the setting of the y frame flip-flop 206 and the x frame flip-flop 204. The x frame flip-flop 204 is then cleared as the right zoom frame counter 206 counts down to zero and the y frame flip-flop 206 is cleared when the bottom zoom frame counter 258 counts down to zero. During the interim period, when the y frame flip-flop 206 is set and the x frame flip-flop 204 alternates, a zoom enable signal will be present as well as a start memory cycle enable signal and cause the display to read the local zoom memory image into the selected local zoom frame.

While the present invention has been described with respect to an interlaced raster scan radar display, it is to be recognized that the present technique applies to any raster scan-type display, interlaced or not. And, while equivalents have been mentioned with respect to various portions of the present apparatus, it is to be recognized that other equivalent circuitry may suggest itself to those of skill in the art upon a reading of the present description. Therefore, the following claims should be interpreted so as to encompass all equivalents that might suggest themselves to one of skill in the art upon a reading of the present specification.

What is claimed is:

1. A display system comprising:
    a raster scan display having a screen upon which data is displayed;
    primary memory means having a multiplicity of addressable storage locations, each of said storage locations in one-to-one correspondence with a one of a like multiplicity of pixels on said screen, for storing the data that comprises a primary image;
    primary scale means for emplacing image data within said primary memory means at a first magnification scale factor;
    secondary memory means having a plurality of addressable storage locations, each of said storage locations in a one-to-one correspondence with a one of a like plurality of pixels on said screen, for storing the data that comprises a secondary image;
    secondary zoom scale means for emplacing said image data within said secondary memory means at a second magnification scale factor different from said first magnification scale factor;
    zoom frame means for establishing the boundaries of a zoom frame on said screen; and
    selective gating means for controllably reading the data from said primary memory means outside of said established zoom frame boundaries and for reading the data from said secondary memory means within said established zoom frame boundaries to said raster scan display for display as a respective primary image and a zoom image upon said screen;
    whereby since the storage locations of each of said primary memory means and said secondary memory means are in a one-to-one correspondence with said pixels on said screen while said image data is emplaced within said primary memory means and within said secondary memory means at a respective first and second magnification scale factors which are different, then the magnification scale of said primary image and said zoom image upon said screen will be different;
    whereby a zoom image of an area of said primary image is juxtapositioned relative to said primary image upon said screen.

2. A display system as set forth in claim 1 further comprising zoom offset means for selectively offsetting said boundaries of said zoom frame to any location on said screen therein changing which ones of said storage locations in said primary memory means are substituted for by ones of said storage locations of said secondary memory means by said means for controllably reading the data.

3. A display system as set forth in claim 1 further comprising zoom scale magnifying means for magnifying said zoom image upon said screen by altering the correspondence between the number of ones of said storage locations in said primary memory means as are substituted for by ones of said storage locations of said secondary memory means by said means for controllably reading data.

4. A display system as set forth in claim 3 wherein said magnifying means comprises:
   means for peak detecting the data for a sampling period, said sampling period corresponding to a selected factor; and
   means for selectively varying the boundaries of said zoom frame by a corresponding factor, thereby accommodating the magnified size of said zoom image.

5. A display system as set forth in claim 1 which further comprises means for tracking a moving target on said primary image and on said zoom image in order that the target remains in the zoom frame as the target moves.

6. A display system as set forth in claim 1 wherein the data stored in said addressable storage locations of said secondary memory means allows that the collective pixels displayed within said zoom image upon said screen of said raster scan display may be displayed at any one of a plurality of shades of intensity.

7. A display system as set forth in claim 1 including:
   means for converting the addresses of data in polar coordinates into Cartesian coordinates; and
   means for translating the center of said polar coordinates with respect to the center of said screen.

8. A display system comprising:
   a raster scan display having a screen upon which data is displayed;
   primary memory means having a first plurality of addressable storage locations, each of said storage locations corresponding to one of a like first plurality of pixels on said screen, for storing first-scaled first data words constituting a primary image;
   secondary zoom memory means having a second plurality of addressable storage locations, each of said storage locations corresponding to one of a like second plurality of pixels on said screen for storing second-scaled second data words constituting a secondary image, said second data being within and a portion of said first data meaning thusly that said secondary image constituted thereby is within and a portion of said primary image;
   primary image scaling and memory loading means for producing, at a first ratio being a first scale of magnification, a first plurality of data words corresponding, at a said first ratio equalling one, to a like first plurality of pixels which constitute a primary image, and for loading said first plurality of data words within said first plurality of addressable storage locations of said primary memory means;
   secondary image scaling and memory loading means for producing, at a second ratio different from said first scale ratio and thusly at a second scale of magnification different from said first scale of magnification, a second plurality of data words corresponding, at a said second ratio not equalling one, to a portion of said first plurality of pixels which constitute said primary image, said second plurality of data words corresponding one-to-one to a secondary image wherein said secondary image is a portion within but not at equal magnification to said primary image, and for loading said second plurality of data words within said second plurality of addressable storage locations of said secondary zoom memory means;
   means for selectively locating the boundaries of a zoom frame on said screen and within which said data from said secondary zoom memory means is displayed;
   means for varying both the numbers of said second plurality of data words and that portion of said first plurality of pixels to which they are correspondent at said second ratio thereto, thereby varying the amount and the information content of said second plurality of data words stored in said secondary zoom memory means;
   means for varying said second ratio, thereby varying the second scale of magnification of said secondary image;
   means for varying the boundaries of said zoom frame on said screen in order to accommodate the total second-scale magnified secondary image; and
   means for controllably reading the data from said primary memory means outside said boundaries of said zoom frame, else the data from said secondary zoom memory means within said boundaries of said zoom frame, in order that a magnified zoom secondary image of a selected portion of said primary image may be juxtapositioned anywhere on said screen relative to said primary image;
   whereby the content of the zoom secondary image may be varied in both amount and in subject;
   whereby the boundaries of the display on the screen of said zoom secondary image may be selectively located and variably sized; and
   whereby the magnification of said zoom secondary image may be varied.

9. A display system as set forth in claim 1 wherein said zoom frame means further comprises:
   zoom frame means for selectively establishing the boundaries of a zoom frame on said screen;
   whereby a zoom image of a selected area of said primary image is juxtapositioned relative to said primary image upon said screen.

10. A display system as set forth in claim 1 wherein said primary scale means further comprises:
   primary scale means for emplacing image data within said primary memory means at a first magnification scale factor equal to one;
   and wherein said secondary zoom scale means further comprises:
   secondary zoom scale means for emplacing said image data within said secondary memory means at a second magnification scale factor selectable to equal either 2×, 4×, or 8× magnification.

* * * * *